(12) United States Patent
Seok et al.

(10) Patent No.: US 11,736,236 B2
(45) Date of Patent: Aug. 22, 2023

(54) METHOD AND APPARATUS FOR HYBRID ARQ ACKNOWLEDGEMENT IN A WIRELESS NETWORK

(71) Applicant: MediaTek Singapore Pte. Ltd., Solaris (SG)

(72) Inventors: Yongho Seok, San Jose, CA (US);
Jianhan Liu, San Jose, CA (US);
James Chih-Shi Yee, San Jose, CA (US); Thomas Edward Pare, Jr., San Jose, CA (US)

(73) Assignee: Mediatek Singapore PTE. LTD., Singapore (SG)

( * ) Notice: Subject to any disclaimer, the term of this patent is extended or adjusted under 35 U.S.C. 154(b) by 12 days.

(21) Appl. No.: 16/748,618

(22) Filed: Jan. 21, 2020

(65) Prior Publication Data

US 2020/0259595 A1 Aug. 13, 2020

Related U.S. Application Data

(60) Provisional application No. 62/845,400, filed on May 9, 2019, provisional application No. 62/804,816, filed on Feb. 13, 2019.

(51) Int. Cl.
*H04L 1/00* (2006.01)
*H04L 1/1812* (2023.01)
(Continued)

(52) U.S. Cl.
CPC .......... *H04L 1/1812* (2013.01); *H04L 1/0042* (2013.01); *H04L 1/0057* (2013.01); *H04L 1/1671* (2013.01); *H04W 28/04* (2013.01)

(58) Field of Classification Search
CPC ... H04L 1/1812; H04L 1/0042; H04L 1/0057; H04L 1/1671; H04L 1/0045;
(Continued)

(56) References Cited

U.S. PATENT DOCUMENTS

| | | | |
|---|---|---|---|
| 9,300,602 B2 | 3/2016 | Sampath et al. | |
| 2007/0153757 A1* | 7/2007 | Kim | H04W 28/06 370/338 |

(Continued)

FOREIGN PATENT DOCUMENTS

| | | |
|---|---|---|
| CN | 106487476 A | 3/2017 |
| CN | 106656429 A | 5/2017 |

(Continued)

*Primary Examiner* — Thai Nguyen

(57) ABSTRACT

Embodiments of the present invention provide a method and apparatus for hybrid ARQ acknowledgement and retransmission requests for decoding failed MPDUs of an A-MPDU received by an STA. The source address and receiver address of a failed MPDU can be verified according to a MAC header CRC that can be included in an A-Control frame, for example. For verifying the source address and the receiver address in MAC header, according to some embodiments, the MAC header CRC is jointly calculated over the first two octets of the MPDU delimiter of an A-MPDU subframe. Moreover, a Hybrid ARQ frame is defined to include Block Ack Bitmap subfield representing the received status of a plurality of MPDUs according to starting sequence control number, for example.

18 Claims, 19 Drawing Sheets

(51) Int. Cl.
*H04L 1/1607* (2023.01)
*H04W 28/04* (2009.01)

(58) Field of Classification Search
CPC ... H04L 1/1867; H04L 1/1607; H04L 1/0061; H04L 1/1621; H04L 1/1829; H04L 1/203; H04W 28/04; H04W 28/0236
See application file for complete search history.

(56) References Cited

U.S. PATENT DOCUMENTS

| | | |
|---|---|---|
| 2007/0186134 A1 | 8/2007 | Singh et al. |
| 2008/0037540 A1* | 2/2008 | Ngo ............... H04L 1/0041 370/392 |
| 2008/0192774 A1 | 8/2008 | Singh et al. |
| 2009/0031185 A1 | 1/2009 | Xhafa et al. |
| 2010/0246543 A1* | 9/2010 | Rajkotia ............ H04L 1/0083 370/392 |
| 2017/0310448 A1 | 10/2017 | Kim et al. |
| 2020/0153547 A1* | 5/2020 | Latif ................. H04L 1/1893 |
| 2021/0075559 A1* | 3/2021 | Epstein ............. H04L 1/0061 |
| 2021/0091887 A1* | 3/2021 | Cho ................. H04L 1/0061 |

FOREIGN PATENT DOCUMENTS

| | | |
|---|---|---|
| EP | 3349505 A1 | 7/2018 |
| GB | 2489281 A | 9/2012 |
| TW | 201519596 A | 5/2015 |
| WO | 2010027200 A2 | 3/2010 |
| WO | 2012030541 A1 | 3/2012 |
| WO | 2015006640 A1 | 1/2015 |

\* cited by examiner

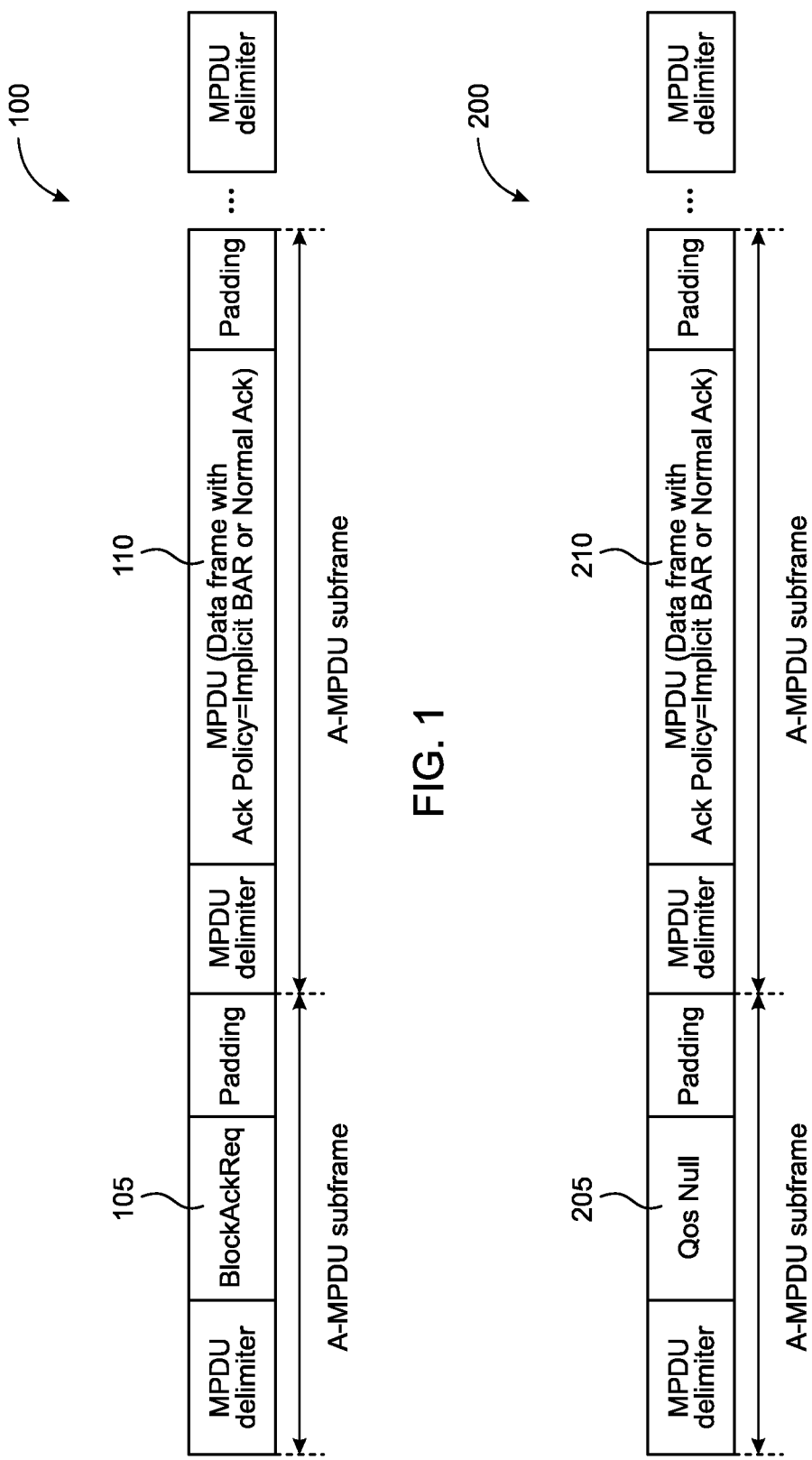

| Ack Type (B11 B12) | TID (B13 B15) | Presence of Block Ack Starting Sequence Control Subfield and Block Ack Bitmap Subfields | Context of a Per AID TID Info Subfield in a Multi-STA BlockAck Frame |
|---|---|---|---|
| 00 | 0-7 | Present | Block acknowledgment context: Sent as an acknowledgment to Qos Data frames that solicit a BlockAck frame response or to a BlockAckReq frame |
| 10 | 0-7 | Not Present | Acknowledgment context: Sent as an acknowledgment to Qos Data or Qos Null frame that solicits an Ack frame response |
| 01 | 0-7 | Not Present | Retransmission context: Sent as a request of a coded data retransmission to a Qos Data or Qos Null frame that solicits an Ack frame response |
| 11 | 5 | Not Present | Management frame/PS-Poll retransmission context: Sent as a request of a coded data retransmission to a management frame carried in an A-MPDU or S-MPDU, or PS-Poll frame in an S-MPDU |
| | 6 | Not Present | All Ack context: Sent as an acknowledgment to an A-MPDU or multi-TID A-MPDU that contains an MPDU that solicits an immediate response and all MPDUs contained in the A-MPDU or multi-TID A-MPDU are received successfully |
| | 7 | Not Present | Management frame/PS-Poll acknowledgment context: Sent as an acknowledgment to a management frame carried in an A-MPDU or S-MPDU, or PS-Poll frame in an S-MPDU |
| | 0-4 | N/A | Reserved |

FIG. 10

METHOD AND APPARATUS FOR HYBRID ARQ ACKNOWLEDGEMENT IN A WIRELESS NETWORK

CROSS-REFERENCE TO RELATED APPLICATIONS

This application claims the benefit of and priority to provisional patent application Ser. No. 62/804,816, with filing date Feb. 13, 2019, and provisional patent application Ser. No. 62/845,400, with filing date May 9, 2019, which are both hereby incorporated by reference in their entirety.

FIELD

Embodiments of the present invention generally relate to the field of wireless communications. More specifically, embodiments of the present invention relate to systems and methods for acknowledging frames and requesting retransmission of frames over a wireless network.

BACKGROUND

Modern electronic devices typically send and receive data with other electronic devices wirelessly using Wi-Fi, and often data that is sent by a transmitter to a receiver is lost or corrupted. This can be due to interference from another electronic device, or other common issues with wireless transmission of data, such as weather or obstructions that physically block the wireless signal. For these reasons, several techniques for retransmitting data have been developed so that data intended for the receiver can be delivered successfully, even if retransmission is required.

Two common techniques for retransmitting data are Automatic Repeat Request (ARQ) and Forward Error Coding (FEC). ARQ is a technique that requires the receiver to send an acknowledgement ("ACK") packet when data has been received successfully. If the data is not delivered successfully or delivered with an error, no ACK is sent to the transmitter. In this case, when the transmitter does not receive an ACK, the data is retransmitted. While this approach leads to very high reliability when transmitting data, sending an ACK for every data packet that is successfully received leads to decreased throughput in the channel when errors occur frequently in the channel.

FEC is a technique that allows a receiver to correct errors in the transmission using error coding and metadata. For instance, data can be sent with a cyclic redundancy check (CRC) digest. FEC reduces errors and only moderately decreases throughput. However, the use of FEC does not lead to high reliability, as some errors may not be able to be corrected using the error coding.

Hybrid automatic repeat request (hybrid ARQ or HARQ) combines high-rate forward error-correcting coding and ARQ error-control. In standard ARQ, redundant bits are added to data to be transmitted based on an error-detecting (ED) code such as a CRC as referred to above. Receivers detecting a corrupted message then request a new message from the sender, the original data is encoded with a forward error correction (FEC) code, and the parity bits are sent along with the message or transmitted upon request when a receiver detects an error. In practice, incorrectly received coded data blocks are often stored at the receiver rather than discarded, and when the re-transmitted block is received, the two blocks are combined. This is referred to as Hybrid ARQ with soft combining. While in some cases it may not be possible to independently decode two transmissions without error, the combination of the previous transmissions received with error may provide enough information to correctly decode the transmissions.

The two main soft combining methods for HARQ are chase combining and incremental redundancy. In chase combining, every re-transmission contains the same information (data and parity bits). The receiver uses maximum-ratio combining to combine the received bits with the same bits from previous transmissions. Because all transmissions are identical, chase combining can be seen as additional repetition coding, where every re-transmission is adding extra energy to the received transmission through an increased signal to noise ratio (e.g., Eb/N0).

For error correction using incremental redundancy, every re-transmission contains different information than the previous transmission. Multiple sets of coded bits are generated, each representing the same set of information bits. The re-transmission typically uses a different set of coded bits than the previous transmission, with different redundancy versions being generated by puncturing the encoder output. Thus, at every re-transmission the receiver gains extra information for error correction.

Hybrid ARQ performs better than ordinary ARQ in poor signal conditions, but in its simplest form this performance comes at the expense of significantly lower throughput in good signal conditions. What is needed is an approach to data retransmission that provides high reliability without significantly reducing the throughput for transmitting data between a transmitter and a receiver in a wireless network.

SUMMARY

Accordingly, embodiments of the present invention provide a method and apparatus for hybrid ARQ acknowledgement and retransmission requests used for decoding failed MAC Protocol Data Units (MPDUs) of an Aggregated MPDU (A-MPDU) received by an STA. The source address and receiver address of a failed MPDU can be verified according to a MAC header CRC that can be included in an A-Control frame, for example. For verifying the source address and the receiver address in a MAC header, according to some embodiments, the MAC header CRC is jointly calculated over the first two octets of the MPDU delimiter of an A-MPDU subframe. Moreover, a Hybrid ARQ frame is defined to include Block Ack Bitmap subfield representing the received status of a plurality of MPDUs according to starting sequence control number, for example.

According to one embodiment, a method of retransmitting a coded data block to decode a failed MPDU of an Aggregated MPDU (A-MPDU) in a wireless network is disclosed. The method includes identifying a first codeword including a first bit of an A-MPDU subframe that carries the failed MPDU, identifying a second codeword including the last bit of the A-MPDU subframe that carries the failed MPDU, and retransmitting a coded data block including the first codeword, the second codeword, and any codewords between the first codeword and the second codeword. The failed MPDU is decoded using the coded data block.

According to some embodiments, the coded data block is encoded using LDCP, the first and second codewords include LDCP codewords, and the codewords between the first LDCP codeword and the second first LDCP codeword include LDCP codewords.

According to some embodiments, the second codeword includes a last bit of padding of the A-MPDU subframe.

According to some embodiments, the A-MPDU subframe includes a data frame associated with an implicit block acknowledgement agreement.

According to some embodiments, an MPDU delimiter of the A-MPDU subframe has been decoded, and where the first codeword is retransmitted without the MPDU delimiter.

According to some embodiments, the method further includes adding padding between MPDUs of the A-MPDU.

According to some embodiments, the adding padding includes adding MPDU delimiters to the A-MPDU, where an MPDU Length field of the MPDU delimiters is set to 0.

According to some embodiments, the A-MPDU includes the MAC header CRC for verifying the source address and the receiver address of the failed MPDU.

According to some embodiments, the MAC header CRC field is included in an A-Control subfield of a data frame of the A-MPDU subframe.

According to some embodiments, the MAC header CRC field is included in the A-MPDU subframe, and the A-MPDU subframe includes a CRC Present subfield.

According to some embodiments, the CRC Present subfield is set to 1 when the MAC Header CRC field of the A-MPDU subframe includes a 16-bit CRC value.

According to some embodiments, the 16-bit CRC value represents a Frame Control field, a Duration/ID field, an Address1 field, an Address2 field, an Address3 field, an Address4 field, a Sequence Control field, a QoS Control field, and an HT Control field of a MAC header.

According to some embodiments, the method further includes calculating the MAC header CRC field over a first two octets of an MPDU delimiter of the A-MPDU subframe.

According to some embodiments, the first two octets of the MPDU delimiter of the A-MPDU subframe include an End-of-frame (EOF) subfield, a CRC type subfield, and an MPDU length subfield.

According to some embodiments, when the CRC Type subfield is set to 1, the CRC field of the MPDU delimiter includes a lower 8 bits of a 16-bit CRC value calculated over the first two octets of the MPDU delimiter, and an upper 8 bits of the 16-bit CRC value is encoded in an A-Control subfield of the failed MPDU.

According to a different embodiment, an apparatus for retransmitting a coded data block to decode a failed MPDU of an Aggregated MPDU (A-MPDU) in a wireless network is disclosed. The apparatus includes a memory and a processor configured to execute instructions for performing a method of automatically retransmitting a coded data block, the instructions being stored in the memory. The method includes verifying a source address and a receiver address of the failed MPDU according to a Media Access Control (MAC) header Cyclic Redundancy Check (CRC), identifying a first codeword including a first bit of an A-MPDU subframe that carries the failed MPDU, identifying a second codeword including the last bit of the A-MPDU subframe that carries the failed MPDU, and retransmitting a coded data block including the first codeword, the second codeword, and any codewords between the first codeword and the second first codeword according to the verified receiver address. The failed MPDU is decoded using the coded data block.

According to another embodiment, a method of requesting retransmission of data in a wireless network is disclosed. The method includes receiving a Physical Layer Convergence Protocol (PLCP) protocol data unit (PPDU) from an access point (AP), where a frame of the PPDU solicits an immediate acknowledgement, transmitting an ACK frame to the AP when a frame body of an MPDU of the PPDU is decoded successfully, transmitting a request frame to the AP when a MAC header of the MPDU is decoded successfully and the frame body of the MPDU is not decoded successfully. The request frame includes a control field and a signal-to-noise ratio (SNR) field, where a value of the control field is set to 0 for requesting uncoded data retransmission, and where the value of the control field is set to 1 for requesting coded data retransmission.

According to some embodiments, the request frame includes a compressed Block Ack (BA) frame, where a Hybrid ARQ type field of the request frame is set to 1, and where the compressed BA frame includes a Block Ack Bitmap subfield indicating a received status of a plurality of MAC Service Data Unit (MSDUs).

According to some embodiments, the Block Ack Bitmap subfield includes a plurality of 2-bit entries corresponding to a received status of a respective MSDU or A-MSDU, where an entry value of 0 indicates a requests for an uncoded data retransmission of a respective MSDU or Aggregated MAC Service Data Unit (A-MSDU), where an entry value of 1 indicates a requests for an coded data retransmission of the respective MSDU or A-MSDU, and where an entry value of 2 indicates successful reception of the respective MSDU or A-MSDU.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a block diagram depicting subframes of an exemplary A-MPDU for performing HARQ in a wireless network according to embodiments of the present invention.

FIG. 2 is a block diagram depicting a QoS null frame of an A-MPDU for performing a computer-implemented method for HARQ in a wireless network according to embodiments of the present invention.

FIG. 10 is a table of exemplary values of a Per AID TID Info subfield in a Multi-STA BA frame according to embodiments of the present invention.

DETAILED DESCRIPTION

Figure 3:
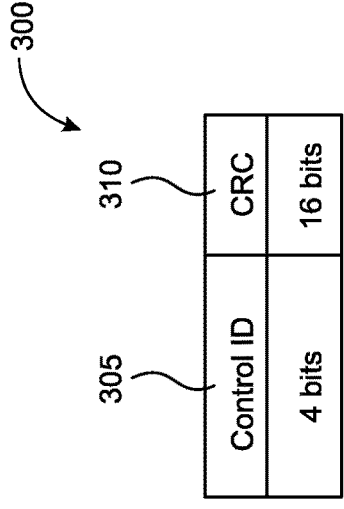
FIG. 3 is a block diagram depicting an exemplary MAC header CRC for performing a computer-implemented method of HARQ in a wireless network according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 17 and 18) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Hybrid ARQ Acknowledgement in an EHT Wireless Network

As used herein, the term "EHT" may refer to a recent generation of wireless communication (Wi-Fi) known as Extremely High Throughput (EHT) and is defined according to the IEEE 802.11be standards. The term station (STA) may refer to an electronic device capable of sending and receiving data over Wi-Fi that is not operating as an access point (AP).

Embodiments of the present invention provide a method and apparatus for HARQ in an EHT wireless network to enable acknowledgement and retransmission requests for decoding failed MPDUs/A-MPDUs received by an STA. The source address and receiver address of a failed MPDU can be verified according to a MAC header CRC that can be included in an A-Control frame, for example. For verifying the source address and the receiver address in the MAC header, according to some embodiments, the MAC header CRC is jointly calculated over the first two octets of the MPDU delimiter of an A-MPDU subframe. Moreover, a Hybrid Automatic Repeat Request (ARQ) frame is defined to include Block Ack Bitmap subfield representing the received status of a plurality of MPDUs according to a starting sequence control number, for example.

In an EHT wireless network, instead of transmitting an individual ACK for every received frame, multiple frames can be acknowledged together using a single Block ACK (BA) frame. A BA frame typically contains a bitmap size of 64*16 bits. These 16 bits indicate the fragment number of the frame to be acknowledged. Each bit of this bitmap represents the status (success/failure) of a frame. For supporting a HARQ in 802.11, a sender and a receiver may need a Block Ack (BA) agreement in place before HARQ can be enabled. If there is no BA agreement in place, the sender can transmit only a single MPDU (S-MPDU) and cannot transmit an aggregated MPDU (A-MPDU). Therefore, when the receiver detects a corrupted message by the CRC, it cannot request a retransmission because the source address and the receiver address in the MAC header are not verified.

In some cases, even if a BA agreement has been established, the sender can transmit only a single MPDU (S-MPDU, non-A-MPDU). For example, in an HE TB PPDU, the resource (RU and UL Length) is controlled by an AP. If the resources allocated are not enough to send more than one MPDUs, an STA can only transmit a single MPDU. Therefore, when the receiver detects a corrupted message by the CRC, it cannot request a retransmission.

Accordingly, with regard to FIG. 1, subframes of an exemplary A-MPDU 100 for performing HARQ in a wireless network (e.g., an 802.11 EHT wireless network) are depicted according to embodiments of the present invention. As depicted in FIG. 1, an immediate BlockAckReq frame 105 is aggregated with another frame 110 that solicits an acknowledgment within the same A-MPDU 100. The Starting Sequence Number of the BAR Information field of the BlockAckReq frame 105 is set to the Sequence Number of the first data frame 110 soliciting an acknowledgment within the same A-MPDU. The TID_INFO subfield of the BAR Control field of the BlockAckReq frame 105 contains the Traffic Identifier (TID) of the first data frame 110 soliciting an acknowledgment within the same A-MPDU 100. However, this solution cannot be used when a frame that solicits an acknowledgment is sent in a non-A-MPDU.

With regard to FIG. 2, a QoS null frame 205 of an A-MPDU 200 for performing a computer-implemented method for HARQ in a wireless network is depicted according to embodiments of the present invention. As depicted in FIG. 2, a QoS Null frame 205 is aggregated with another frame 210 that solicits an acknowledgment within the same A-MPDU. The Sequence Number of the QoS Null frame 205 is set to the Sequence Number of the first data frame soliciting an acknowledgment within the same A-MPDU 200. The TID subfield of the QoS Control field of the QoS Null frame 205 contains the TID of the first data frame 210 soliciting an acknowledgment within the same A-MPDU 200.

The ACK Policy subfield in the QoS Control field of the QoS Null frame 205 is set to a predefined value (e.g., 01 or 11) for Hybrid Acknowledgement. The predefined value cannot be 00 (Implicit BAR or Normal ACK) nor 10 (No ACK)). A STA that received the QoS Null frame 205 having the ACK Policy subfield set to the predefined Hybrid Acknowledgment responds with an acknowledgment when it successfully decodes the data frame having the Sequence Number and TID indicated in the QoS Null frame 205. However, the HARQ solutions depicted in FIGS. 1 and 2 that aggregate a BlockAckReq frame or a QoS Null frame are incomplete solutions for a non-A-MPDU (e.g., a single MPDU) because the source address and the receiver address are unverified. Therefore, HARQ can be used when the PSPDU contains multiple MPDUs, and one of the multiple MPDUs is successfully received at station. In this case, the station can determine the destination address of the MPDU for determining the remaining codewords based on the successfully received MPDU.

With regard to FIGS. 3-5B, according to embodiments of the present invention, a MAC header CRC can be included in an MPDU for performing HARQ in an EHT wireless network. The approaches represented in FIGS. 3-5B can provide a more complete acknowledgement solution with fewer limitations than the HARQ approaches described in FIGS. 1 and 2. Specifically with regard to FIG. 3, an exemplary CRC field 310 for a computer-implemented approach to HARQ in an EHT wireless network is depicted according to embodiments of the present invention. For verifying the source address and the receiver address in a MAC header, a Control ID 305 and a CRC field 310 can be included in an A-Control subfield (CRC A-Control) 300. In a 16-bit CRC calculation, the CRC field 310 value is presumed to 0. The CRC field 310 of the CRC A-Control has a 16-bit CRC value for the following fields of the MAC header:
  Frame Control (2 octets)
  Duration/ID (2 octets)
  Address1 (6 octets)
  Address2 (6 octets)
  Address3 (6 octets)
  Address4 (0 or 6 octets)
  Sequence Control (2 octets)
  QoS Control (0 or 2 octets)
  HT Control (4 octets).

Figure 4:
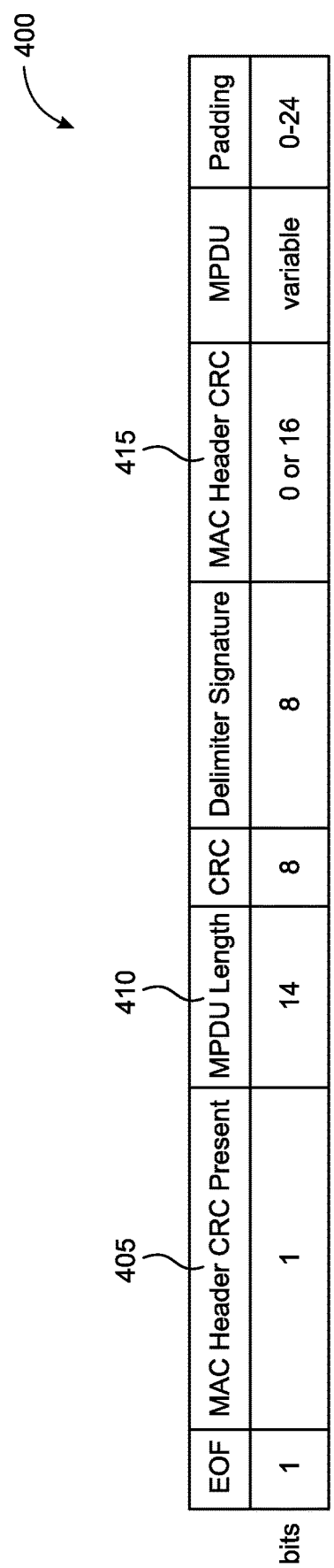
FIG. 4 is a block diagram of an exemplary MAC header CRC for performing a computer-implemented method of HARQ in an EHT wireless network where the MAC header CRC is included in an A-MPDU subframe according to embodiments of the present invention.

With regard to FIG. 4, an exemplary MAC Header CRC subfield 415 for a computer-implemented approach to HARQ in an EHT wireless network is depicted according to embodiments of the present invention. For verifying the source address and the receiver address in a MAC header, the MAC Header CRC field 415 is included in A-MPDU subframe 400. When the MAC Header CRC Present subfield 405 of the MPDU delimiter of the A-MPDU subframe is set to 1, the MAC Header CRC field 415 of the A-MPDU subframe 400 has 16-bit CRC value for the following fields of the MAC header:
  Frame Control (2 octets)
  Duration/ID (2 octets)
  Address1 (6 octets)
  Address2 (6 octets)
  Address3 (6 octets)
  Address4 (0 or 6 octets)
  Sequence Control (2 octets)
  QoS Control (0 or 2 octets)
  HT Control (4 octets).

When the Media Access Control (MAC) Header CRC Present subfield 405 is set to 1, the MPDU Length subfield 410 is a nonzero value. When the MAC Header CRC Present subfield 405 of the MPDU delimiter of the A-MPDU subframe 400 is not set to 1, a MAC Header CRC field 415 is not included in the A-MPDU subframe 400.

Figure 5A:
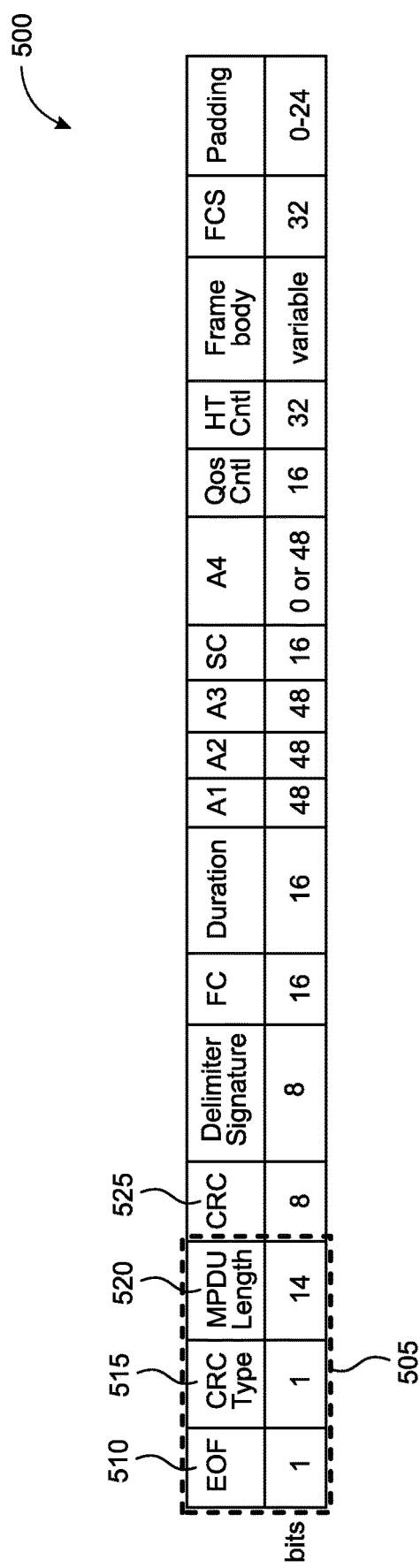
FIG. 5A is a block diagram depicting an exemplary MPDU delimiter of an A-MPDU subframe for a computer-implemented method of HARQ in an EHT wireless network according to embodiments of the present invention.

With regard to FIG. 5A, an exemplary MPDU delimiter 500 of an A-MPDU subframe for a computer-implemented HARQ method in an EHT wireless network is depicted according to embodiments of the present invention, where a MAC header CRC is jointly calculated over two octets. To verify the source address and the receiver address in the MAC header, the MAC header CRC is jointly calculated over the first two octets (B0-B15) 505 that include the End-of-frame (EOF) subfield 510, the CRC Type subfield 515, and the MPDU Length subfield 520 of the MPDU delimiter 500 of the A-MPDU subframe. Accordingly, the MPDU delimiter of the A-MPDU subframe includes the CRC Type subfield 515. When the CRC Type subfield 515 is set to 0, the CRC field 525 of the MPDU delimiter 500 is the 8-bit CRC value of the first two octets (B0-B15) 505 that include the EOF subfield 510 and MPDU Length subfield 520 of the MPDU delimiter 500.

Figure 5B:
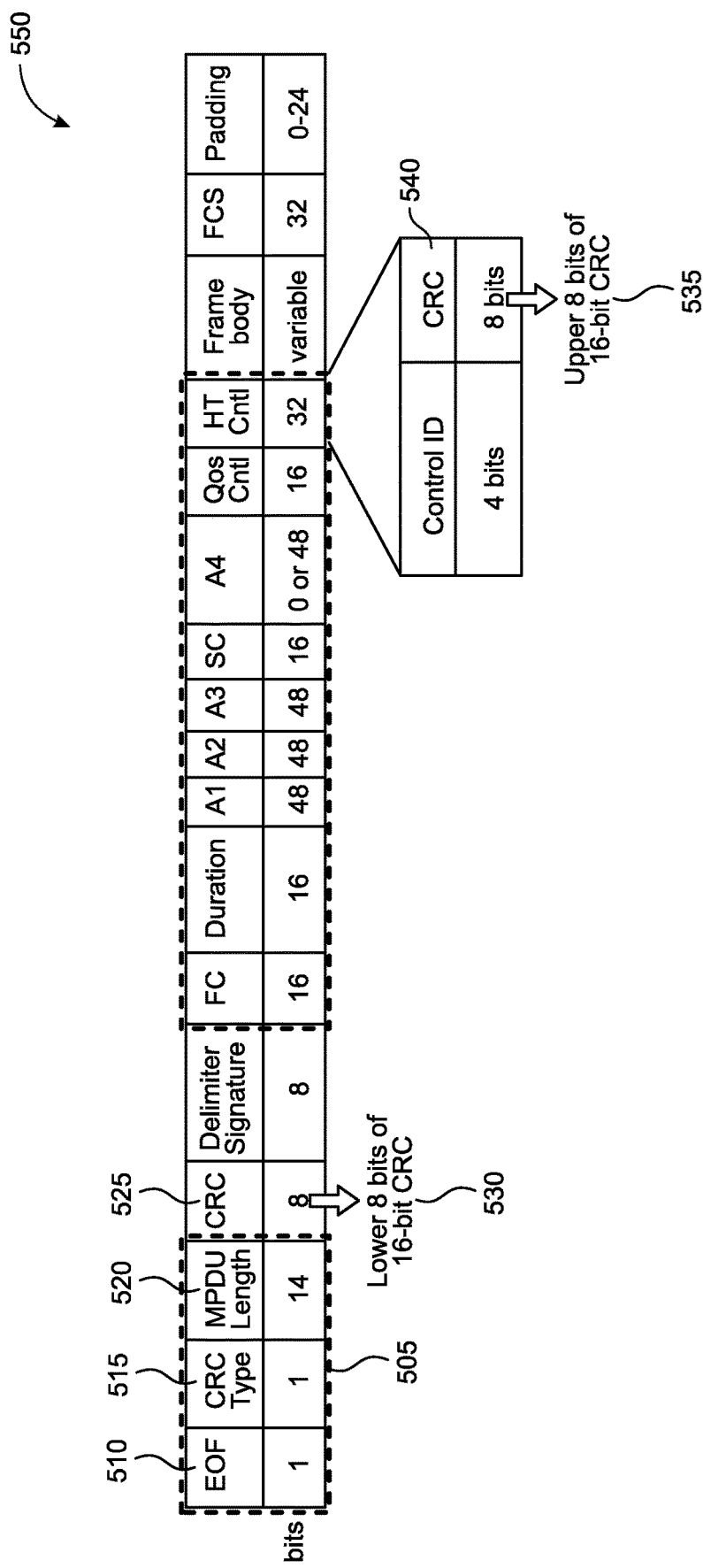
FIG. 5B is a block diagram depicting an exemplary MPDU delimiter of an A-MPDU subframe having a CRC Type subfield set to 1 for a computer-implemented method of HARQ in an EHT wireless network according to embodiments of the present invention.

As depicted in FIG. 5B, when the CRC Type subfield 515 is set to 1, the CRC field of an exemplary MPDU delimiter 550 is the lower 8 bits 530 of the 16-bit CRC value calculated over the first two octets (B0-B15) 505 that include the EOF subfield 510 and MPDU Length subfield 520 of the MPDU delimiter, and the MAC header of the MPDU contained in the A-MPDU subframe. The upper 8 bits 535 of 16-bit CRC value are encoded in the A-Control subfield 540 (e.g., the CRC A-Control). For a 16-bit CRC calculation, the CRC field value is presumed to be 0. When the CRC Type subfield 515 is set to 1, the MPDU Length subfield 520 is a nonzero value.

Figure 6:
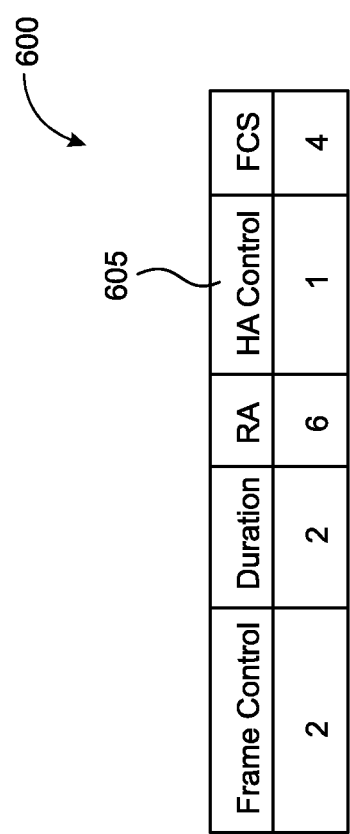
FIG. 6 is a block diagram depicting an exemplary HARQ Acknowledgement frame including a 1-bit HA type subfield in an HA control field for implementing a MAC header CRC according to embodiments of the present invention.

As depicted in FIG. 6, for implementing a MAC header CRC, an exemplary HARQ Acknowledgement (HA) frame 600 is defined to include a 1-bit HA type subfield in an HA control field 605 according to embodiments of the present invention. The HA type subfield is set to 0 if the receiver requests an uncoded data retransmission. In this case, the STA retransmits the same uncoded data as the original transmission. When the PHY applies a channel coding process, such as low-density parity-check (LDPC), the channel coding parameters of the retransmitted data can be different than the channel coding parameters used for the initial data transmission.

The HA type subfield of HA control field 605 is set to 1 when the receiver requests a coded data retransmission. The STA retransmits the same coded data as the original transmission. Because the PHY does not apply a separate channel coding process for the retransmitted data, the channel coding parameters of the initial data transmission can be used for the retransmitted data. For example, when the LDPC encoding is used, the same LDPC codewords are sent for the initial data and the retransmitted data. In either case, a 6-bit SNR field can be set to an SNR averaged over the data subcarriers and space-time streams.

The receiver sends an ACK frame after receiving HA frame 600 when the receiver successfully decodes a frame body of an MPDU soliciting an acknowledgment in an S-MPDU or other non-A-MPDU. Otherwise, if the receiver successfully decodes a MAC header of an MPDU soliciting an acknowledgment in a non-A-MPDU or a S-MPDU, but fails to decode the frame body, the receiver can send an HA frame 600 with the HA type subfield of HA control field 605 set to 0 when the receiver prefers an uncoded data retransmission, such as when the SNR is too low. The receiver can send an HA frame 600 with the HA type subfield of HA control field 605 set to 1 when the receiver prefers a coded data retransmission, such as when the SNR is relatively high. The SNR can be determined based on the number of failed codewords, for example. If a relatively high number of codewords were not received successfully (e.g., 25 of 30 codewords), a full retransmission may be preferred. If the receiver does not successfully decode the frame body or MAC header, or if the MPDU does not solicit an acknowledgment, the receiver does not respond.

As depicted in FIGS. 7A-10, multiple exemplary Compressed BA variant frames are defined to represent the received status of an ARQ or HARQ operation and for requesting coded or uncoded data retransmission in an EHT wireless network according to embodiments of the present invention.

Figure 7A:
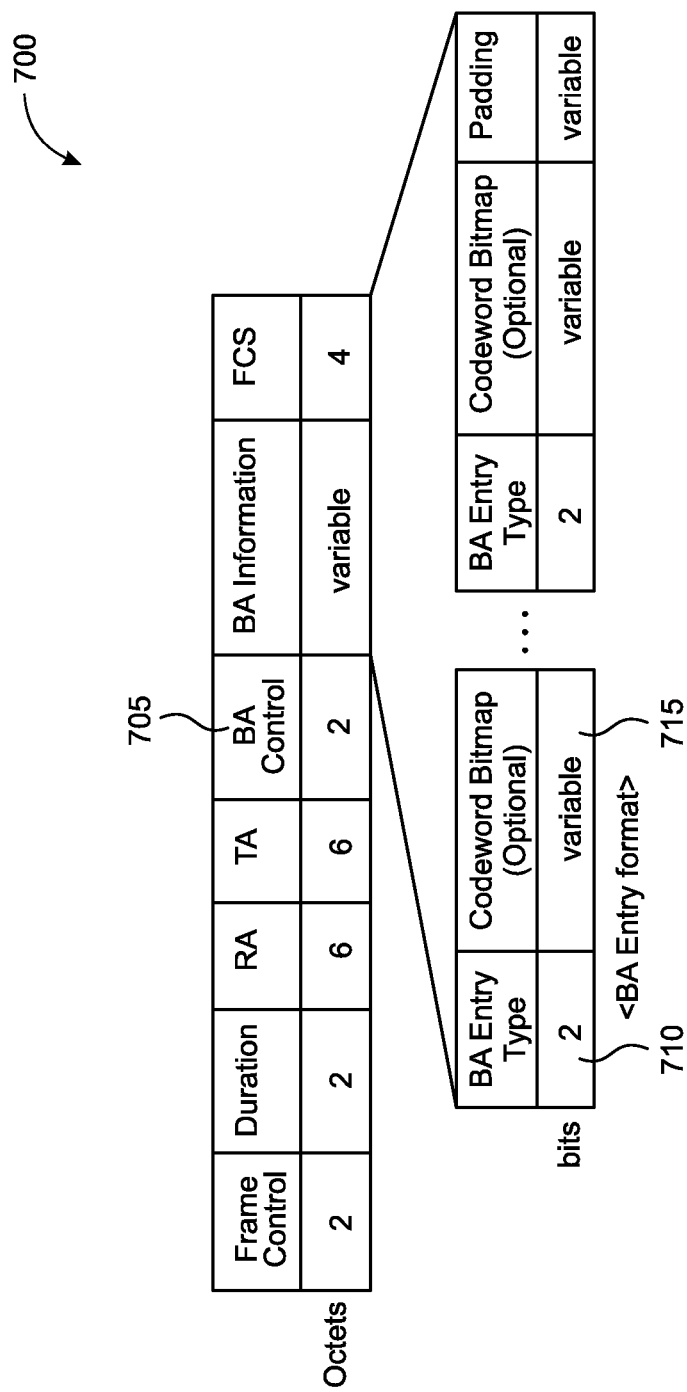
FIG. 7A is a block diagram depicting an exemplary Compressed BA variant frame according to embodiments of the present invention.

With regard to FIG. 7A, an exemplary Compressed BA variant frame 700 is depicted according to embodiments of the present invention. The optional Codeword Bitmap can include a Codeword Bitmap Length and a Codeword ACK Bitmap. The Codeword Bitmap Length indicates the length of the Codeword ACK Bitmap. The Codeword Bitmap Length field has a length of 2 bits, and the Codeword ACK Bitmap can have a length of 8, 16, 32, or 64 bits.

The maximum supported MPDU sizes in bytes are 3895, 7991, or 11454, in one example. The Codeword ACK Bitmap length supports an acknowledgment of 34, 67, or 96 codewords Specifically, when the maximum MPDU size is 3895, the maximum number of LDPC codewords is 34; when the maximum MPDU size is 7991, the maximum number of LDPC codewords is 67; and when the maximum MPDU size is 11,454, the maximum number of LDPC codewords is 96 in this example.

Still with regard to FIG. 7A, when the BA type subfield of BA control field 705 is set to 1, the BA entry type 710 of the each BA entry is set to 0 for requesting a retransmission of a single MSDU or A-MSDU. The BA entry type 710 of the each BA entry is set to 1 for indicating an acknowledgement of the successful reception of a single MSDU or A-MSDU, and the optional Codeword Bitmap 715 is not present in the corresponding BA entry. The BA entry type 710 of the each BA entry is set to 2 for requesting a retransmission of the failed codewords of a single MSDU or A-MSDU, and the Codeword Bitmap 715 is present in the corresponding BA entry. Importantly, the Codeword Bitmap 715 includes a Codeword ACK Bitmap field that indicates the indexes of the failed codewords, and a Codeword Bitmap Length field that indicates the length of the Codeword ACK Bitmap. Specifically, according to some embodiments, a Codeword Bitmap Length value of 0 indicates a bitmap length of 16 bits; a Codeword Bitmap Length value of 1 indicates a bitmap length of 32 bits; a Codeword Bitmap Length value of 2 indicates a bitmap length of 64 bits; and a Codeword Bitmap Length value of 3 indicates a bitmap length of 128 bits. In this case, an STA retransmits only the failed codewords among the codewords of the requested MSDU or A-MSDU.

The BA entry type 710 of the each BA entry is set to 3 for requesting retransmission of the failed codewords of a single MSDU or A-MSDU. The Codeword Bitmap 715 is present in the corresponding BA entry, and each bit of the Codeword Ack Bitmap field indicates whether N consecutive codewords have failed to be decoded. When the BA entry type of the BA entry is set to 2, each bit of the Codeword ACK Bitmap field indicates whether 1 codeword in sequential order has failed.

Figure 7B:
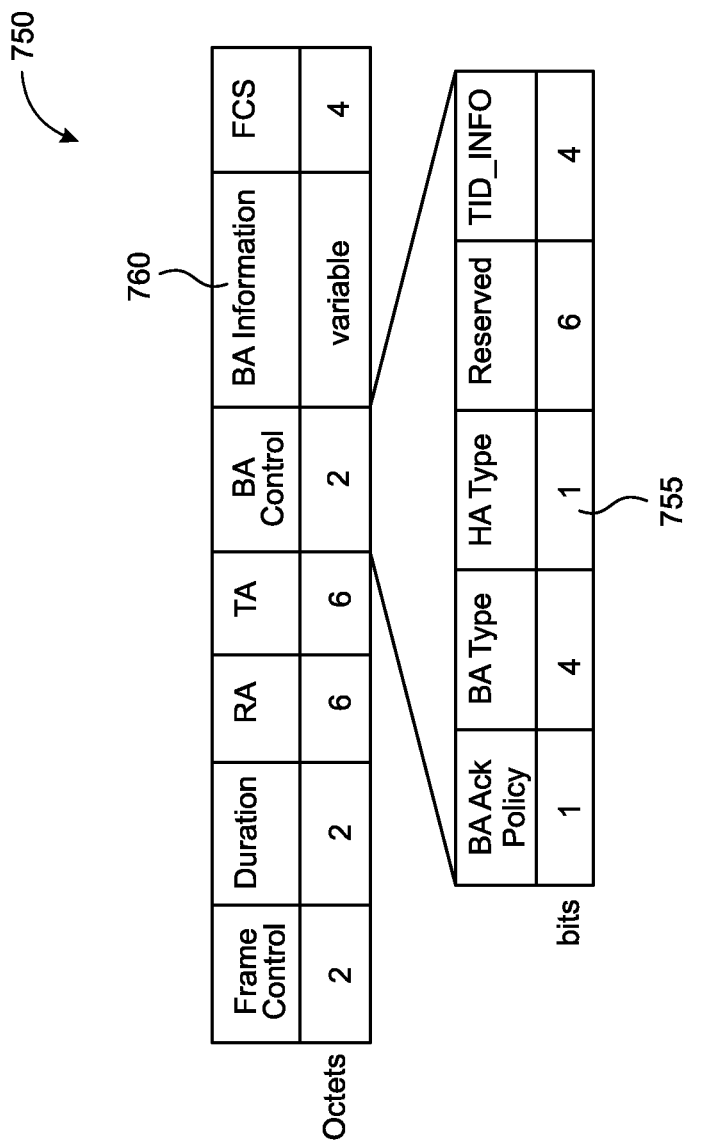
FIG. 7B is a block diagram depicting an exemplary Compressed BA variant frame where the HA type subfield is set to 0 when the BA Information represents a received status of an ARQ operation according to embodiments of the present invention.

With regard to the exemplary Compressed BA variant frame 750 depicted in FIG. 7B, the HA type subfield 755 is set to 0 if the BA Information field 760 represents a received status of an ARQ operation. In this case, the BA Bitmap subfield in the BA Information field 760 of the Compressed BA variant frame 750 indicates the received status, where each 1-bit entry represents a specific MSDU or A-MSDU. The HA type subfield 755 is set to 1 if the BA Information field 760 represents a received status of an HARQ operation. The BA Bitmap subfield in the BA Information field 760 of the Compressed BA variant frame 750 indicates the received status and is extended to 2 bits, where each 2-bit entry represents a specific MSDU or A-MSDU. Moreover, when the HA type subfield 755 is set to 1, the BA Bitmap subfield of the BA Information field 760 of the Compressed BA variant frame 750 indicates the received status in order of sequence number, with the first bit of the BA Bitmap field corresponding to the MSDU or the A-MSDU having a sequence number that matches the value of the Starting Sequence Number subfield of the BA Starting Sequence Control subfield.

The BA Bitmap subfield in the BA Information field 760 of the compressed BA variant frame 750 indicates the received status according to a value that is set between 0 and 2. Specifically, an entry equal to 2 in the compressed BA Bitmap subfield represents acknowledgment of a successful reception of a single MSDU or A-MSDU. An entry equal to 1 in the compressed BA Bitmap field represents a request for a coded data retransmission of a single MSDU or A-MSDU. In this case, an STA retransmits the same coded data for the requested MSDU or A-MSDU. Because the PHY does not apply a separate channel coding process for the retransmitted data, the same channel coding parameters from the initial data transmission are used for the retransmitted data. For example, when LDPC encoding is used, the same LDPC codewords are sent for the initial data transmission and the retransmitted data. An entry equal to 0 in the compressed BA Bitmap field represents a request for an uncoded data retransmission of a single MSDU or A-MSDU. In this case, an STA retransmits the same uncoded data for the requested MSDU or A-MSDU. When the PHY applies channel coding such as LDPC, different channel coding parameters can be used for the initial data transmission and the retransmitted data.

Figure 8:
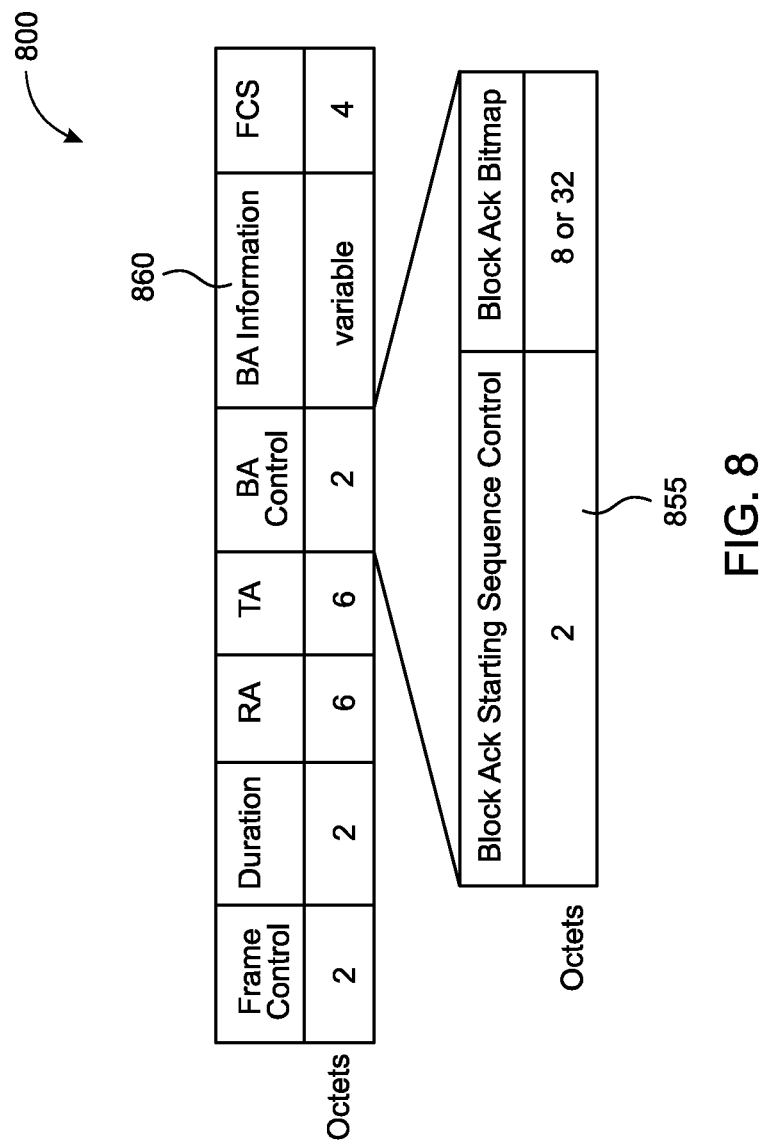
FIG. 8 is a block diagram depicting an exemplary Compressed BA variant frame including an HA type subfield encoded in a Fragment Number subfield of a BA Starting Sequence Control field according to embodiments of the present invention.

With regard to FIG. 8, an exemplary Compressed BA variant frame 800 including an HA type subfield encoded in a Fragment Number subfield of a BA Starting Sequence Control field 855 is depicted according to embodiments of the present invention. The HA type subfield encoded in the BA Starting Sequence Control field 855 is set to 0 if the BA Bitmap represents the received status of an ARQ operation. In this case, the BA Bitmap subfield of the BA Information field of the Compressed BA frame indicates the received status, where each 1-bit entry represents the status of a specific MSDU or A-MSDU. The HA type subfield encoded in the BA Starting Sequence Control field is set to 1 if the BA Bitmap represents the received status of an HARQ operation. In this case, the BA Bitmap subfield of the BA Information field 860 of the Compressed BA variant frame 800 indicates the received status, where each 2-bit entry represents a specific MSDU or A-MSDU.

Figure 9:
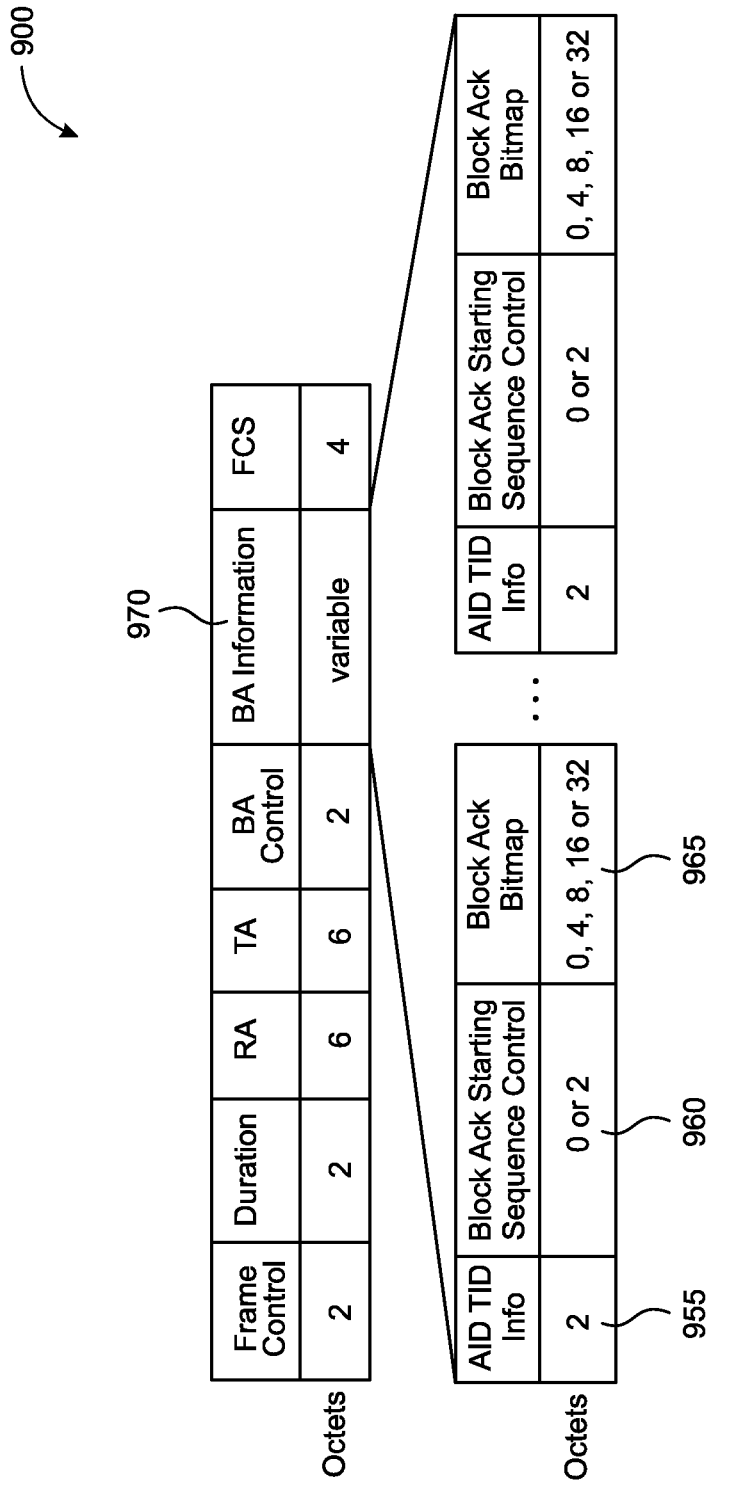
FIG. 9 is a block diagram depicting an exemplary Multi-STA BA variant frame that can be retransmitted to provide an ACK to multiple STAs according to embodiments of the present invention.

FIG. 9 depicts an exemplary Multi-STA BA variant frame 900 according to embodiments of the present invention. The Multi-STA BA variant frame 900 can be retransmitted to provide an ACK to multiple STAs. A Per AID TID Info subfield 955 of the Multi-STA BA frame provides context for different ACK types. FIG. 10 lists exemplary values of the Per AID TID Info subfield in a Multi-STA BA frame according to embodiments of the present invention. When the ACK Type subfield of the Per AID TID Info subfield 955 (FIG. 9) is equal to 1, the HA type subfield is encoded in a Fragment Number subfield of the Block ACK Starting Sequence Control field 960. The HA type subfield encoded in the Fragment Number subfield is set to 0 if the BA Bitmap represents the received status for the ARQ operation. In this case, the BA Bitmap subfield 965 of the BA Information field 970 of the Multi-STA BA variant frame 900 indicates the received status, where each 1-bit entry represents a specific MSDU or A-MSDU. The HA type subfield encoded in the Fragment Number subfield is set to 1 if the BA Bitmap represents the received status for an HARQ operation. In this case, the BA Bitmap subfield 965 of the BA Information field 970 of the Multi-STA BA variant frame 900 indicates the received status, where each 2-bit entry represents a specific MSDU or A-MSDU.

According to some embodiments, the Multi-STA BA variant frame can include BA information for a plurality of STAs within a single BA Information subfield. For example, for Hybrid ARQ Acknowledgment for an EHT TB PPDU, an Extended Multi-STA BlockAck variant frame can be used. In the Extended Multi-STA BA variant frame, the HA type subfield is set to 0 if the BA Information 970 represents the received status for the ARQ operation, or set to 1 if the BA Information 970 represents the received status for the HARQ operation of the multi-STA. When the HA type subfield is set to 1, the length of the BA Bitmap subfield is variable. The length can be determined by parsing all BA entries based on the maximum number of MSDUs/A-MSDUs that can be acknowledged when the Per AID TID Info subfield 955 indicates the presence of a BA Starting Sequence Control subfield 960 and Block Ack Bitmap subfield 965.

With regard to FIG. 10, a table 1000 of exemplary values of a Per AID TID Info subfield in a Multi-STA BA frame is depicted according to embodiments of the present invention. The Per AID TID Info subfield of the Multi-STA BA frame provides context for different ACK types 00, 10, 01, and 11. The TID values and presence of Block Ack Starting Sequence Control subfield and Block Ack Bitmap subfields are indicated for each Ack Type.

Figure 11:
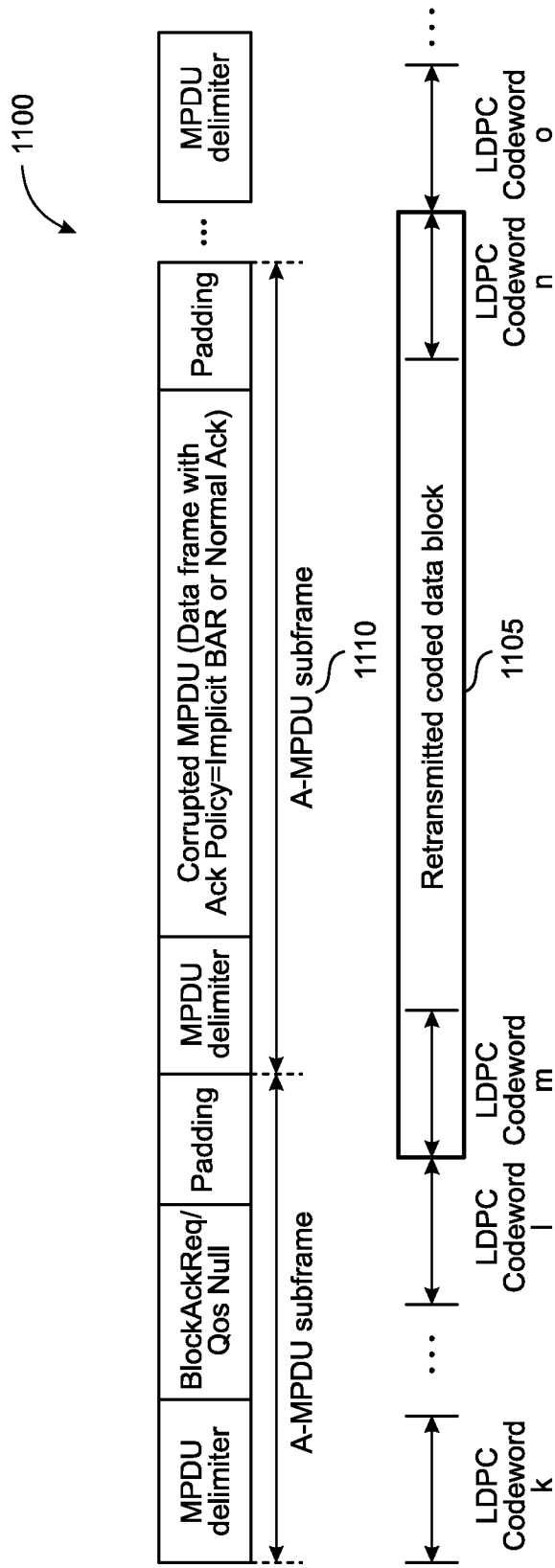
FIG. 11 is a transmission diagram depicting an exemplary computer-implemented HARQ retransmission scheme for wireless networks according to embodiments of the present invention.

FIGS. 11-14 are transmission diagrams representing exemplary computer-implemented HARQ retransmission schemes for wireless networks depicted according to embodiments of the present invention. In the exemplary HARQ retransmission scheme depicted in transmission diagram 1100 of FIG. 11, for LDPC coding, the coded data block 1105 is determined based on the first LDPC codeword that contains the first bit of the A-MDPU subframe 1110 that carries the corrupted MPDU, and the last LDPC codeword that contains the last bit of the A-MPDU subframe 1110. In this case, the first LDPC codeword contains the first bit of the MPDU delimiter of the A-MPDU subframe 1110 that carries the corrupted MPDU and the last LDPC codeword contains the last bit of padding of the A-MPDU subframe 1110 that carries the corrupted MPDU. As depicted in FIG. 11, LDPC codeword m to LDPC codeword n represent the coded data block 1105 for retransmission.

Figure 12:
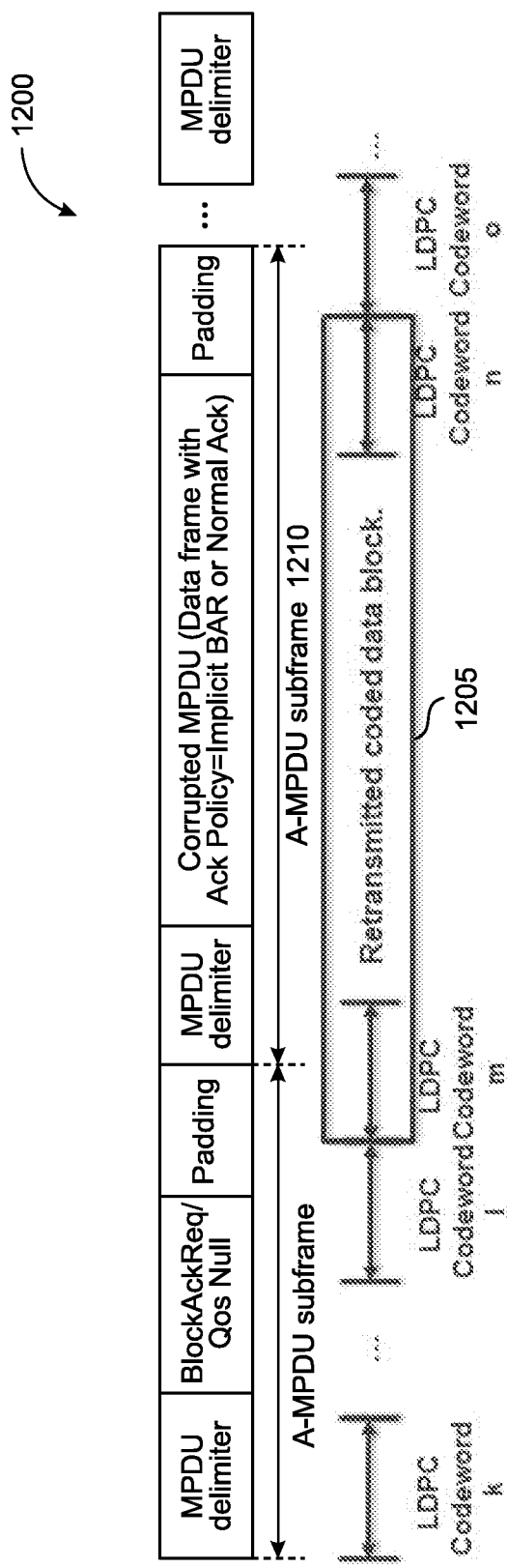
FIG. 12 is a transmission diagram depicting an exemplary computer-implemented HARQ retransmission scheme for wireless networks that ignores subframe padding according to embodiments of the present invention.

As depicted in the exemplary transmission diagram 1200 of FIG. 12, according to other embodiments, the coded data block 1205 is determined based on the first LDPC codeword that contains the first bit of the A-MDPU subframe 1210 that carries the corrupted MPDU, and the last LDPC codeword that contains the last bit of the MPDU of the A-MPDU subframe 1210. In this case, the last LDPC codeword does not consider the padding of the A-MPDU subframe 1210 because the padding is not necessary for decoding the MPDU. Therefore, as depicted in FIG. 12, LDPC codeword m to LDPC codeword n represent the coded data block for retransmission.

Figure 13:
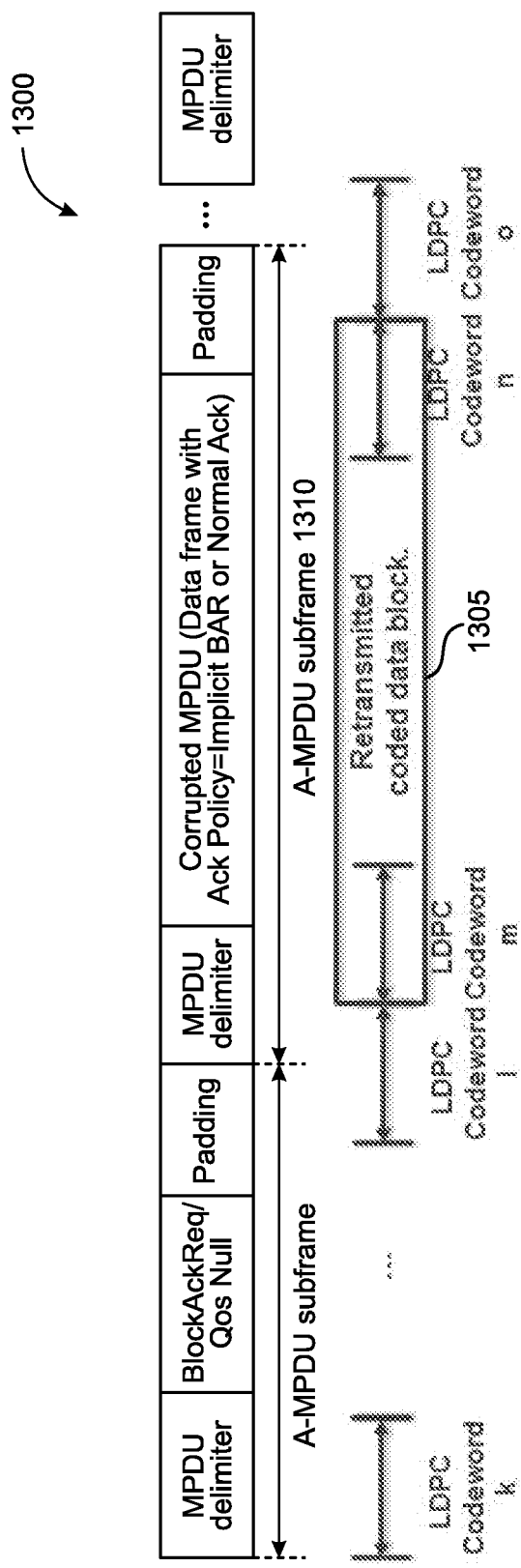
FIG. 13 is a transmission diagram depicting an exemplary computer-implemented HARQ retransmission scheme for wireless networks that does not consider the MPDU delimiter according to embodiments of the present invention.

As depicted in the exemplary transmission diagram 1300 of FIG. 13, according to other embodiments, the coded data block 1305 is determined based on the first LDPC codeword that contains the first bit of the corrupted MPDU of the A-MDPU subframe 1310, and the last LDPC codeword that contains the last bit of the MPDU of the A-MPDU subframe 1310. In this case the first LDPC codeword does not consider the MPDU delimiter of the A-MPDU subframe 1310 because the MPDU delimiter is already decoded. LDPC codeword m to the LDPC codeword n represent the coded data block 1305 for retransmission.

Figure 14:
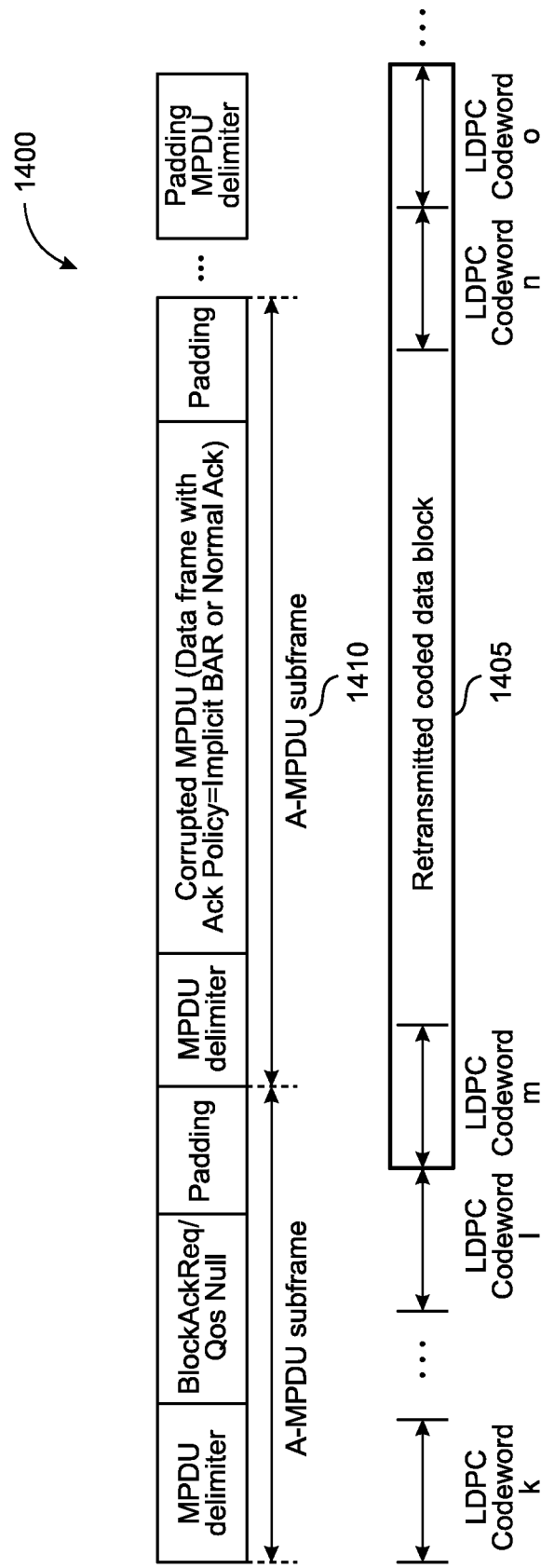
FIG. 14 is a transmission diagram depicting an exemplary computer-implemented HARQ retransmission scheme for wireless networks that adds subframe padding according to embodiments of the present invention.

According to some embodiments, an STA cannot start the transmission of more than one MPDU within the time limit described in a Minimum MPDU Start Spacing field declared by the intended receiver. Therefore, as depicted in FIG. 14, an STA adds padding between MPDUs in an A-MPDU in the form of one or more MPDU delimiters with an MPDU Length field set to 0. If one or more padding MPDU delimiters follow the corrupted MPDU, the sender that retransmits the coded data block of the corrupted MPDU also includes MPDU delimiters for padding the coded data block. In case of the LDPC coding, the coded data block is determined based on the first LDPC codeword that contains the first bit of the A-MDPU subframe 1410 that carries the corrupted MPDU and the last LDPC codeword that contains the last bit of the MPDU delimiters. In the exemplary transmission diagram 1400 of FIG. 14, LDPC codeword m to LDPC codeword o represent the coded data block 1405 for retransmission. Specifically, the first LDPC codeword contains the first bit of the MPDU delimiter of the A-MPDU subframe 1410 that carries the corrupted MPDU, and the last LDPC codeword contains the last bit of the MPDU delimiters with the MPDU Length field set to 0.

Figure 15:
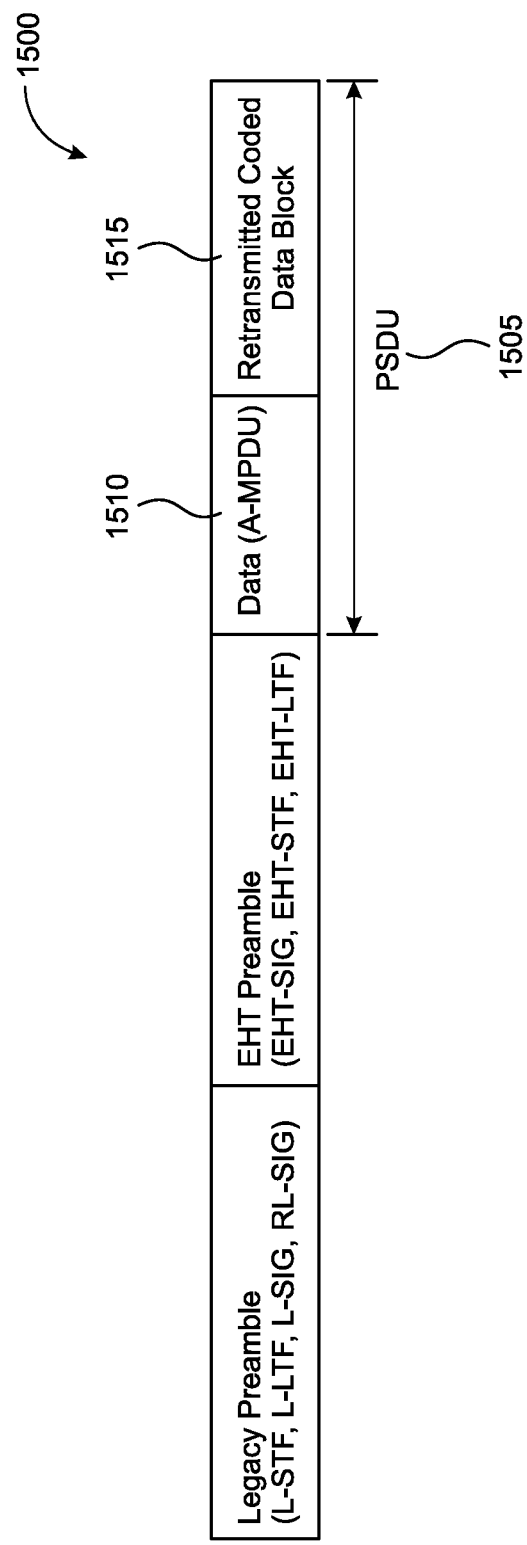
FIG. 15 is a block diagram depicting an exemplary PPDU structure for supporting Hybrid ARQ according to embodiments of the present invention.

With regard to FIG. 15, an exemplary PPDU structure 1500 for supporting Hybrid ARQ is depicted according to embodiments of the present invention. The PLCP Service Data Unit (PSDU) 1505 can include a Data field 1510 and a Retransmitted Coded Data Block field 1515. When the Retransmitted Coded Data Block field 1515 is present, the Data field 1510 includes an HARQ Control frame for determining the contents of the Retransmitted Coded Data Block field.

Figure 16:
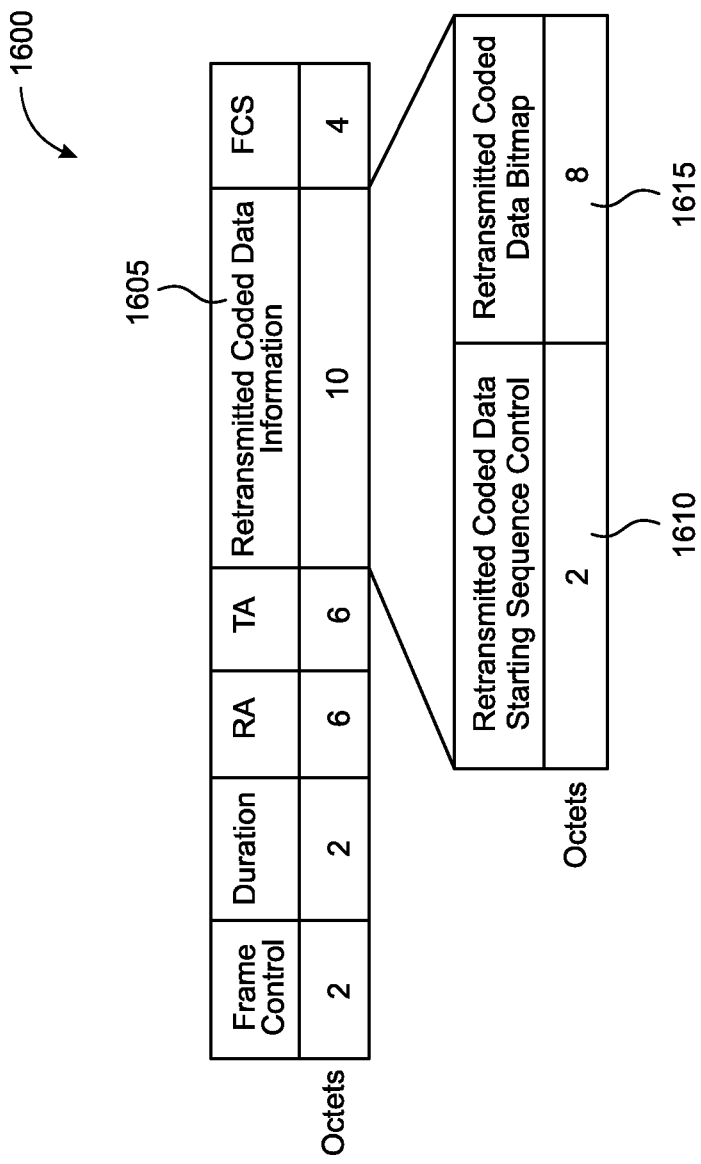
FIG. 16 is a block diagram depicting an exemplary HARQ Control frame for performing a computer-implemented method of HARQ in a wireless network according to embodiments of the present invention.

With regard to FIG. 16, an exemplary HARQ Control frame 1600 for performing a computer-implemented method of HARQ in a wireless network is depicted according to embodiments of the present invention. The Retransmitted Coded Data Bitmap subfield 1605 indicates which of the MPDUs are retransmitted in the coded data block, where each entry represents a specific MSDU or an A-MSDU in the order of sequence number. The first bit of the Retransmitted Coded Data Bitmap field 1615 corresponds to the MSDU or A-MSDU having a sequence number that matches the value of the Starting Sequence Number subfield of the Retransmitted Coded Data Starting Sequence Control subfield 1610.

The EHT-SIG of the EHT preamble contains length information for determining the encoding parameter of the Data field of the PSDU. During the LDPC encoding process, the length information determines the encoding parameters $N_{avbits}$ and $N_{pld}$ for LDPC encoding of the Data field (excluding the Retransmitted Coded Data Block in the PSDU), where $N_{avbits}$ represents the number of available bits in the minimum number of OFDM symbols in which the Data field of the packet may fit, and $N_{pld}$ represents the number of bits in the Data field and Service field. Based on the $N_{avbits}$ and $N_{pld}$ values, the number of LDPC codewords ($N_{CW}$) and LDPC codeword length (bits) are determined for LDPC encoding the Data field. The Length information can be encoded as the number of bits/bytes/OFDM symbols of the Data field and Service field, or the number of bits/bytes/OFDM symbols of the Retransmitted Coded Data block field.

When the Retransmitted Coded Data Block field is present, the receiver uses the length information of the EHT-SIG of the EHT preamble for LDPC decoding. The decoding parameters $N_{avbits}$ and $N_{pld}$ are determined by the length information of the EHT-SIG of the EHT preamble. Otherwise, if the Retransmitted Coded Data Block field is not present, the receiver uses the length information of the L-SIG of the legacy preamble for LDPC decoding. The decoding parameters $N_{avbits}$ and $N_{pld}$ are determined by the length information of the L-SIG of the legacy preamble.

The LDPC codeword length of the Data field of the PSDU can be signaled through the EHT-SIG of EHT preamble. For example, when $N_{avbits}$ is greater than 2,592 bits, an LDPC codeword length of 1,944 bits can be used. Since the LDPC codeword is not aligned with a boundary of the A-MSDU subframe, an average of 1,944 bits corresponds to the overhead for each retransmitted MPDU. To reduce the overhead, the sender can use the smaller LDPC codewords and then signal the selected LDPC codeword length.

Figure 17:
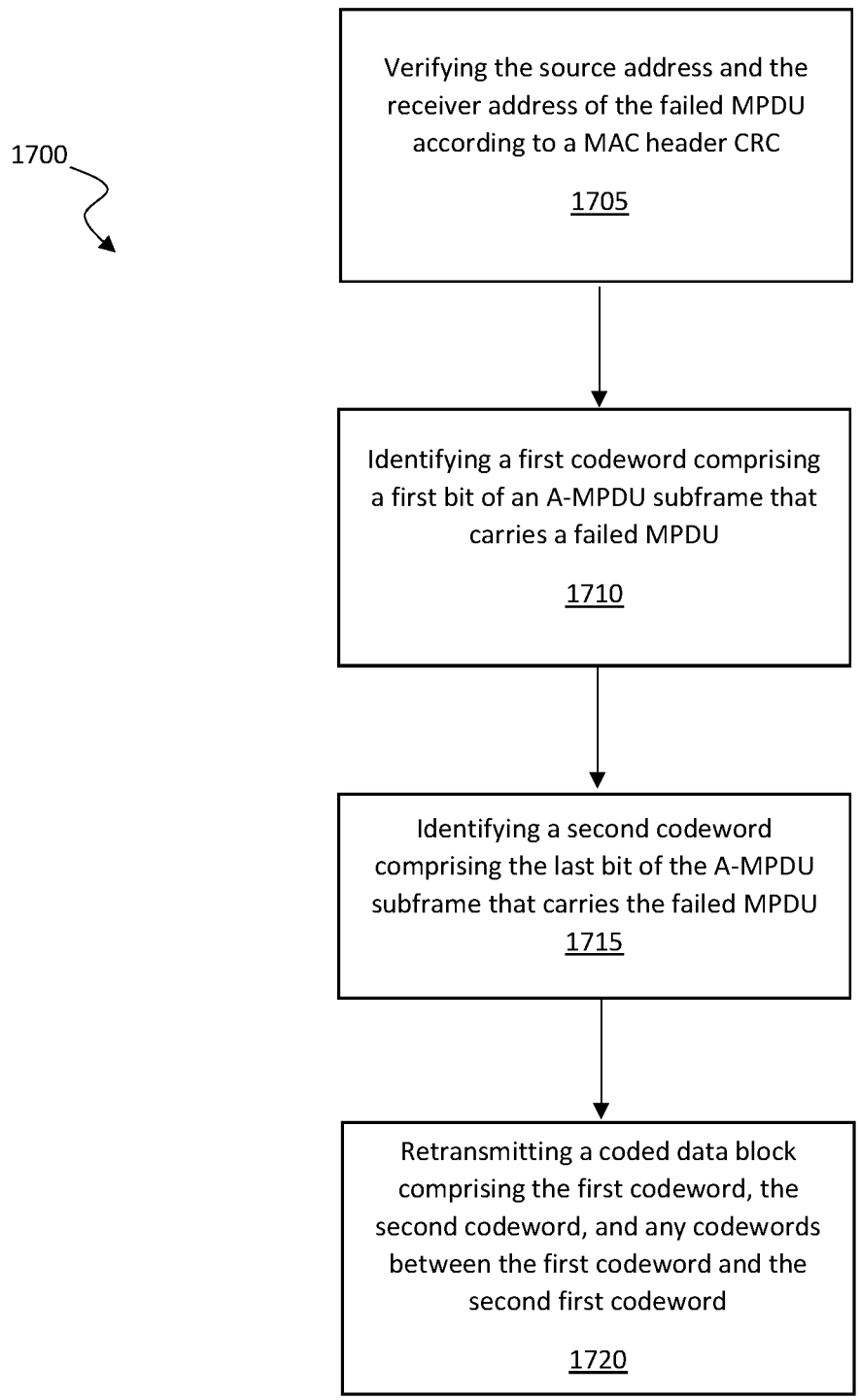
FIG. 17 is a flow chart depicting an exemplary sequence of computer implemented steps for automatically retransmitting a coded data block to decode a failed MPDU of an A-MPDU in a wireless network according to embodiments of the present invention.

With regard to FIG. 17, a flowchart of an exemplary sequence of computer-implemented steps 1700 for automatically retransmitting a coded data block to decode a failed MPDU of an A-MPDU in a wireless network is depicted according to embodiments of the present invention.

At step 1705, the source address and the receiver address of the failed MPDU are verified according to a MAC header CRC by a wireless AP.

At step 1710, a first codeword comprising a first bit of an A-MPDU subframe that carries a failed MPDU is identified by the wireless AP.

At step 1715, a second codeword comprising the last bit of the A-MPDU subframe that carries the failed MPDU is identified by the wireless AP.

At step 1720, a coded data block comprising the first codeword, the second codeword, and any codewords between the first codeword and the second first codeword are retransmitted by the wireless AP to decode the failed MPDU.

Figure 18:
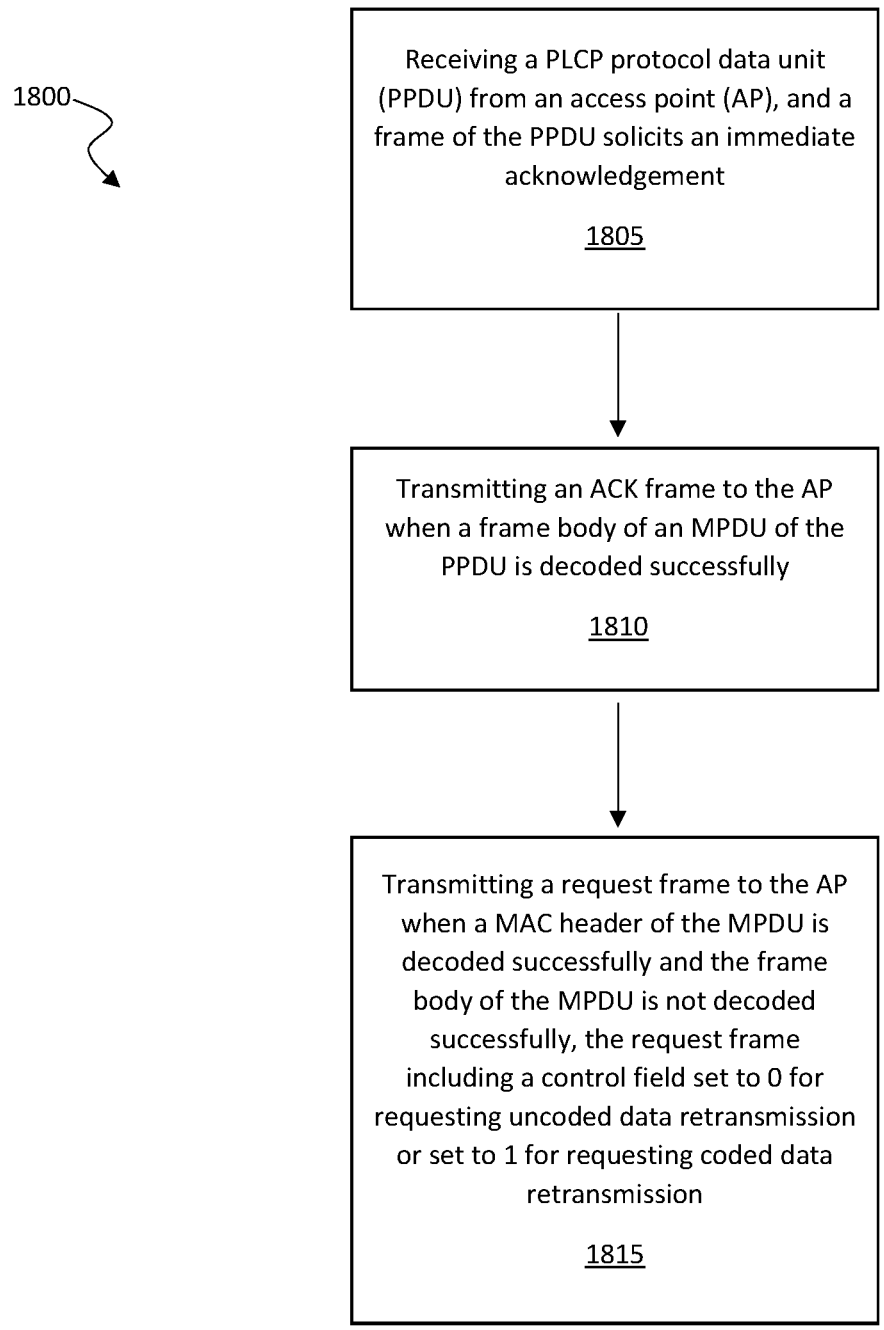
FIG. 18 is a flow chart depicting an exemplary sequence of computer implemented steps for automatically requesting retransmission of data in a wireless network in a wireless network according to embodiments of the present invention.

With regard to FIG. 18, a flowchart of an exemplary sequence of computer-implemented steps 1800 for requesting retransmission of data in a wireless network is depicted according to embodiments of the present invention.

At step 1805, a PLCP protocol data unit (PPDU) is received from a wireless AP by a wireless STA, and a frame of the PPDU solicits an immediate acknowledgement.

At step 1810, an ACK frame is transmitted to the AP by the wireless STA when a frame body of an MPDU of the PPDU is decoded successfully.

At step 1815, a request frame is transmitted to the AP by the wireless STA when a MAC header of the MPDU is decoded successfully and the frame body of the MPDU is not decoded successfully. The request frame includes a control field set to 0 for requesting uncoded data retransmission or set to 1 for requesting coded data retransmission.

Exemplary Computer Controlled System

Embodiments of the present invention are drawn to electronic systems for performing HARQ acknowledgement and data retransmission requests in a wireless network. The following discussion describes one such exemplary electronic system or computer system can be used as a platform for implementing embodiments of the present invention.

Figure 19:
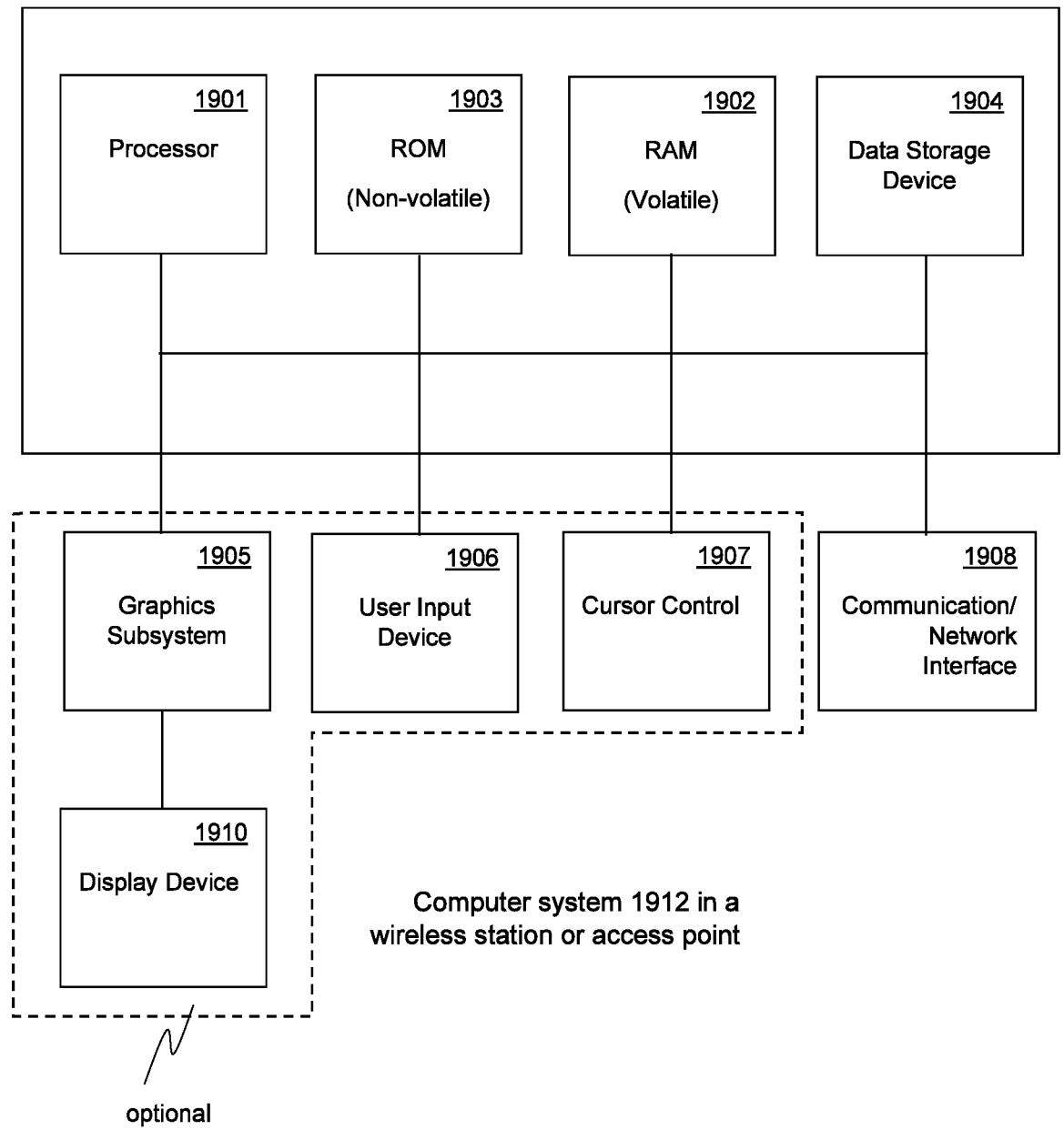
FIG. 19 is a block diagram of an exemplary computer system platform upon which embodiments of the present invention may be implemented.

In the example of FIG. 19, the exemplary computer system 1912 (e.g., a multi-band cooperative wireless access point AP or a multi-band cooperative wireless station STA) includes a central processing unit (such as a processor or CPU) 1901 for running software applications and optionally an operating system. Random access memory 1902 and read-only memory 1903 store applications and data for use by the CPU 1901. Data storage device 1904 provides non-volatile storage for applications and data and may include fixed disk drives, removable disk drives, flash memory devices, and CD-ROM, DVD-ROM or other optical storage devices. The optional user inputs 1906 and 1907 comprise devices that communicate inputs from one or more users to the computer system 1912 (e.g., mice, joysticks, cameras, touch screens, and/or microphones).

A communication or network interface 1908 includes one or more transceivers and allows the computer system 1912 to communicate with other computer systems, networks, or devices via an electronic communications network, including wired and/or wireless communication and including an Intranet or the Internet (e.g., 802.19 wireless standard). The communication or network interface 1908 can transmit frames for HARQ acknowledgement and data retransmission requests over a wireless network.

The optional display device 1910 may be any device capable of displaying visual information in response to a signal from the computer system 1912 and may include a flat panel touch sensitive display, for example, and may be remotely disposed. The components of the computer system 1912, including the CPU 1901, memory 1902/1903, data storage 1904, user input devices 1906, and graphics subsystem 1905 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of retransmitting a coded data block to decode a failed MAC Protocol Data Unit (MPDU) of an Aggregated MPDU (A-MPDU) performed by a wireless device in a wireless network, the method comprising:
   identifying a first codeword comprising a first bit of an A-MPDU subframe that carries the failed MPDU;
   identifying a second codeword comprising a last bit of the failed MPDU;
   encoding the coded data block using low-density parity-check (LDPC) or decoding an MPDU delimiter of the A-MPDU subframe, wherein the first and second codewords comprise LDPC codewords, and wherein the codewords between the first LDPC codeword and the second LDPC codeword comprise LDPC codewords; and
   retransmitting the coded data block, the coded data block comprising the first codeword, the second codeword, and any codewords between the first codeword and the second codeword, wherein the first codeword in the coded data block is retransmitted without the MPDU delimiter, and
   wherein the failed MPDU is operable to be decoded using the coded data block.

2. The method as described in claim 1, wherein the second codeword comprises a last bit of padding of the A-MPDU subframe.

3. The method as described in claim 1, wherein the A-MPDU subframe comprises a data frame associated with an implicit block acknowledgement agreement.

4. The method as described in claim 1, wherein the retransmitting the coded data block comprises adding padding between MPDUs of the A-MPDU for retransmission.

5. The method as described in claim 4, wherein the adding padding comprises adding MPDU delimiters to the A-MPDU, wherein an MPDU Length field of the MPDU delimiters is set to 0.

6. The method as described in claim 1, further comprising receiving a Block Acknowledgement (BA) frame comprising a BA information subfield operable to indicate if the BA frame represents acknowledgement of a hybrid automatic repeat request (HARD) operation, and a BA entry type subfield operable to indicate acknowledgment of successful reception of a single MAC Service Data Unit (MSDU) or Aggregated MAC Service Data Unit (A-MSDU) of the A-MPDU, and to indicate a request for retransmission of failed codewords of an MSDU or an A-MSDU of a previously transmitted A-MPDU.

7. The method as described in claim 1, wherein the retransmitting the coded data block comprises transmitting an HARQ Control frame in a data field of a Physical Layer Convergence Protocol Service Data Unit (PSDU), wherein the PSDU comprises an extremely high-throughput (EHT) preamble comprising a length information field for determining encoding parameters for LDPC encoding of the data field, and wherein the coded data block comprises only failed codewords of the failed MPDU.

8. An apparatus for retransmitting a coded data block to decode a failed MPDU of an Aggregated MPDU (A-MPDU) in a wireless network, the apparatus comprising:
   a memory; and
   a processor configured to execute instructions for performing a method of automatically retransmitting a coded data block, the instructions stored in the memory, and the method comprising:
      verifying a source address and a receiver address of the failed MPDU according to a Media Access Control (MAC) header Cyclic Redundancy Check (CRC) field;
      identifying a first codeword comprising a first bit of an A-MPDU subframe that carries the failed MPDU;
      identifying a second codeword comprising a last bit of the failed MPDU;
      encoding the coded data block using low-density parity-check (LDPC) or decoding an MPDU delimiter of the A-MPDU subframe, wherein the first and second codewords comprise LDPC codewords, and wherein the codewords between the first LDPC codeword and the second LDPC codeword comprise LDPC codewords; and
      retransmitting the coded data block according to a verified receiver address from the verifying, the coded data block comprising the first codeword, the second codeword, and any codewords between the first codeword and the second codeword, wherein the first codeword in the coded data block is retransmitted without the MPDU delimiter, and
      wherein the failed MPDU is operable to be decoded using the coded data block.

9. The apparatus as described in claim 8, wherein the retransmitting the coded data block according to a verified receiver address from the verifying comprises adding padding to the A-MPDU for retransmission.

10. The apparatus as described in claim 9, wherein the adding padding comprises adding MPDU delimiters to the A-MPDU, wherein an MPDU Length field of the MPDU delimiters is set to 0.

11. The apparatus as described in claim 8, wherein the A-MPDU comprises the MAC header CRC field for verifying the source address and the receiver address of the failed MPDU.

12. The apparatus as described in claim 11, wherein the MAC header CRC field is included in an A-Control subfield of a data frame of the A-MPDU subframe.

13. The apparatus as described in claim 11, wherein the MAC header CRC field is included in the A-MPDU subframe, and wherein the A-MPDU subframe comprises a CRC Present subfield.

14. The apparatus as described in claim 13, wherein the CRC Present subfield is set to 1 when the MAC Header CRC field of the A-MPDU subframe comprises a 16-bit CRC value.

15. The apparatus as described in claim 14, wherein the 16-bit CRC value represents a Frame Control field, a Duration/ID field, an Address1 field, an Address2 field, an Address3 field, an Address4 field, a Sequence Control field, a QoS Control field, and a high-throughput (HT) Control field of a MAC header.

16. A method of requesting retransmission of data performed by a wireless device in a wireless network, the method comprising:

receiving a Physical Layer Convergence Protocol (PLCP) protocol data unit (PPDU) from an access point (AP), wherein a frame of the PPDU requests an immediate acknowledgement;

transmitting an ACK frame to the AP when a frame body of an MPDU of the PPDU is decoded successfully; and transmitting a request frame to the AP when a MAC header of the MPDU is decoded successfully and the frame body of the MPDU is not decoded successfully, wherein the request frame comprises:

a control field, wherein a value of the control field is 0 for requesting uncoded data retransmission, and wherein the value of the control field is 1 for requesting coded data retransmission; and a signal-to-noise ratio (SNR) field.

17. The method as described in claim 16, wherein the request frame comprises a compressed Block Ack (BA) frame, wherein a Hybrid ARQ type field of the request frame is set to 1, and wherein the compressed BA frame comprises a Block Ack Bitmap subfield indicating a received status of a plurality of MSDUs of the MPDU.

18. The method as described in claim 17, wherein the Block Ack Bitmap subfield comprises a plurality of 2-bit entries corresponding to a received status of a respective MSDU or A-MSDU, wherein an entry value of 0 indicates a requests for an uncoded data retransmission of a respective MSDU or A-MSDU of the MPDU, wherein an entry value of 1 indicates a requests for an coded data retransmission of the respective MSDU or A-MSDU of the MPDU, and wherein an entry value of 2 indicates successful reception of the respective MSDU or A-MSDU of the MPDU.

* * * * *